United States Patent [19]

Ashida

[11] Patent Number: 5,274,446
[45] Date of Patent: Dec. 28, 1993

[54] IMAGE TRANSMISSION APPARATUS WITH DIAGNOSTIC PROCESSING MEANS

[75] Inventor: Yasushi Ashida, Hyogo, Japan

[73] Assignee: Mitsubishi Denki Kabushiki Kaisha, Tokyo, Japan

[21] Appl. No.: 863,784

[22] Filed: Apr. 6, 1992

[30] Foreign Application Priority Data

Jun. 27, 1991 [JP] Japan .................................. 3-181699
Aug. 23, 1991 [JP] Japan .................................. 3-235696
Sep. 12, 1991 [JP] Japan .................................. 3-260560

[51] Int. Cl.⁵ ............................................ H04N 17/00
[52] U.S. Cl. ................................ 358/139; 324/158 R; 371/20.5; 371/5.1
[58] Field of Search ................... 358/10, 12, 139, 140; 324/158 R; 379/96-98, 1, 28, 29, 201, 202, 53-54; 371/20.5, 5.1, 68.2

[56] References Cited

U.S. PATENT DOCUMENTS

| | | | |
|---|---|---|---|
| 3,562,710 | 4/1968 | Halleck | 371/5.1 |
| 3,889,109 | 6/1975 | Blessin | 371/20.5 |
| 3,916,381 | 10/1975 | Johnson, III et al. | 371/20.5 |
| 4,242,750 | 12/1980 | Finck et al. | 371/20.5 |

FOREIGN PATENT DOCUMENTS 1-166365 6/1989 Japan.

OTHER PUBLICATIONS

"Television Conference System", Mitsubishi Denki Giho, vol. 60 Nov. 10, 1986.

Primary Examiner—James J. Groody
Assistant Examiner—Glenton B. Burgess
Attorney, Agent, or Firm—Rothwell, Figg, Ernst & Kurz

[57] ABSTRACT

An image transmission apparatus which is capable of self-diagnosis automatically and successively and which is also capable of automatic system recovery In one embodiment, self-diagnosis may be instructed from a remote station. A reference video signal generated by a pattern generator is supplied to return loops and the return data and the original video signal are compared with each other in a pattern diagnostic circuit. The results of the diagnosis are displayed on a diagnosis result panel. A self-diagnosis start instruction is given from an external circuit and the diagnosis result is transmitted over the line. A change-over switch switches the working and backup circuit systems of the sending and receiving sides responsive to the diagnosis result.

13 Claims, 9 Drawing Sheets

IMAGE TRANSMISSION APPARATUS WITH DIAGNOSTIC PROCESSING MEANS

BACKGROUND OF THE INVENTION

1. Field of the Invention

The present invention relates to an image transmission apparatus used for television conference systems, television telephone systems, and the like.

2. Description of the Prior Art

FIG. 1 shows in block diagram the image transmission apparatus based on the DCT scheme which is derived from the block diagram of the image processing apparatus based on the VQ scheme disclosed in publication "Mitsubishi Electric Corp. Technical Bulletin", Vol. 60, No. 10, p. 40, published in 1986. In the figure, indicated by 1 is an image pickup camera, 2 is an A/D converter which converts the analog video signal in NTSC format produced by the camera 1 into a digital video signal, 3 is a CIF converter which converts the digital video signal from the A/D converter 2 into a signal of CIF format, 4 is a sending frame memory which stores the CIF-formatted video signal provided by the CIF converter 3, 5a is a subtracter which evaluates the difference between the video signal read out of the sending frame memory 4 and the decoded video signal of the previous frame (a video signal from a movement compensating filter 12 which will be explained shortly), 5 is a DCT encoder which implements DCT-encoding for the differential signal from the subtracter 5a, 6 is a variable-length encoder which encodes the video signal from the DCT encoder 5, 7 is a sending buffer which temporarily holds the video signal from the variable-length encoder 6, 8 is a multiplexer which multiplexes the video signal from the sending buffer 7 with other data, and 9 is a line interface which transmits the multiplexed data from the multiplexer 8 over a line.

Indicated by 10 is a local decoder which decodes the video signal that has been DCT-encoded by the DCT encoder 5, 11a is an adder which merges the video signal from the local decoder 10 with the decoded video signal of the previous frame (a video signal from the movement compensating filter 12), 11 is an intra-loop frame memory which temporarily stores the merged video signal, and 12 is a movement compensating filter which implements compensating the movement and filtering for picture quality improvement based on the video signal from the intra-loop frame memory 11 and the video signal from the sending frame memory 4.

Indicated by 13 is a line interface for receiving data over the line, 14 is a separator which separates multiplexed data provided by the line interface 13, 15 is a variable-length decoder which decodes the video signal from the separator 14, 16 is a receiving buffer which temporarily holds the video signal from the variable-length decoder 15, 17 is a DCT decoder which decodes the video signal from the receiving buffer 16, 18 is a movement decoder which decodes the movement, 19a is an adder which the merges video signal from the DCT decoder 17 with the video signal from the movement decoder 18, and 19 is an intra-loop frame memory which temporarily stores the result of summation for the implementation of movement decoding Indicated by 20 is a receiving frame memory which temporarily stores the same contents as of the intra-loop frame memory 19 for the implementation of CIF inverse conversion, 21 is a CIF inverse converter which inverts the video signal from the receiving frame memory 20, 22 is a D/A converter which converts the digital video signal from the CIF inverse converter 21 into an analog video signal, 23 is a monitor panel for displaying the video signal provided by the D/A converter 22, and 24 is a system controller which controls the overall apparatus.

Indicated by 112 is an A/D turn loop which is selected manually through the command of the system controller 24, 102 is a FIL turn loop which is selected manually through the command of the system controller 24, 103 is a LDC turn loop which is selected manually through the command of the system controller 24, 104 is a BM turn loop which is selected manually through the command of the system controller 24, and 105 is a OA turn loop path which is selected manually through the command of the system controller 24.

Next, the operation of the foregoing image transmission apparatus will be explained, first for the signal path in the normal operation and next for the loop paths.

During the normal operation, the video signal produced by the camera 1 is fed to the A/D converter 2, by which the analog video signal is converted into the digital video signal. The digital video signal of NTSC format is converted into the signal of CIF format, which is the world standard video format, by the CIF converter 3 and then the resulting data is stored temporarily in the sending frame memory 4.

The subtracter 5a evaluates the difference between the video signal read out of the sending frame memory 4 and the video signal of the previous frame which has been rendered coding and decoding, and the differential signal is DCT-coded by the DCT encoder 5. The DCT-coded video signal is coded by the variable-length encoder 6, and at the same time it is sent to the local decoder 10 for DCT decoding. The DCT-decoded video signal is merged by the adder 11a with the coded-and-decoded video signal of the previous frame which is provided by the movement compensating filter 12, and the resulting data is stored temporarily in the intra-loop frame memory 11. The video signal stored in the intra-loop frame memory 11 is compared with the video signal stored in the sending frame memory 4 by the movement compensating filter 12, by which the signal is rendered the movement compensation and then filtering for the enhancement of picture quality, and the video signal derived from that of the previous frame, with coding and decoding being done, is produced.

The video signal coded by the variable-length encoder 6 is fed through the sending buffer 7 and multiplexed with other data (not shown in FIG. 1) by the multiplexer 8. The multiplexed data is transmitted over the line through the line interface 9.

Multiplexed data coming over the line is received by the line interface 13, and separated into a video signal and other data by the separator 14. The separated video signal is decoded by the variable-length decoder 15, fed through the receiving buffer 16, and decoded by the DCT decoder 17. The DCT-decoded video signal is merged with the video signal of the previous frame by the adder 19a, and it is stored temporarily in the receiving frame memory 20 and also stored temporarily in the intra-loop frame memory 19. The video signal read out of the intra-loop frame memory 19 is rendered the movement decoding (compensation) by the movement decoder 18, and a video signal of the previous frame is produced.

The video signal held in the receiving frame memory 20 has its CIF format converted into NTSC format by the CIF inverse converter 21, and it is further converted into an analog video signal by the D/A converter 22 and delivered to the monitor panel 23. These operations are controlled by the system controller 24.

The loop paths are used to test the operations of the sections of the image transmission apparatus. The loop pathes include the A/D turn loop 112, FIL turn loop 102, LDC turn loop 103, BM turn loop 104 and OA turn loop 105, and any of the loop paths is activated manually through the system controller 24.

With the A/D turn loop 112 being active, the analog video signal provided by the camera 1 is once converted into a digital video signal by the A/D converter 2, and then immediately converted back to a digital video signal by the D/A converter 22 and delivered to the monitor panel 23. With the FIL turn loop 102 being active, the video signal at the output of the sending frame memory 4 is shunted to the receiving frame memory 20. With the LDC turn loop 103 being active, the video signal at the output of the DCT encoder 5 is fed through the local encoder 10, intra-loop frame memory 11 and movement compensating filter 12, and shunted to the receiving frame memory 20. With the BM turn loop 104 being active, the video signal at the output of the sending buffer memory 7 is shunted to the variable-length decoder 15. With the OA turn loop 105 being active, the video signal at the output of the line interface 9 is shunted to the line interface 13.

These five test loops are used in the event of failure of the image transmission apparatus for finding a possible faulty section based on the judgement procedure shown in FIG. 2. Referring to FIG. 2, if the A/D turn loop test through the OA turn loop test have all terminated normally, then the image transmission apparatus under test is normal. If the A/D turn loop test through the LDC turn loop test have terminated normally and the remaining loop tests have revealed abnormalities, then a section after the variable-length encoder 16 will be defective. If the A/D turn loop test and FIL turn loop test have terminated normally and the remaining turn loop tests have revealed abnormalities, then a section after the DCT encoder 10 will be defective. If only the A/D turn loop test has terminated normally and the remaining turn loop tests have revealed abnormalities, then a section after the CIF converter 3 will be defective. If all loop tests have revealed abnormalities, then a section after the A/D converter 2 will be defective. These loop tests are conducted by activating the test loops sequentially from the A/D turn loop 112 up to the OA turn loop 105, while the staff of test watches the monitor panel 23 for the judgement of each test.

The conventional image transmission apparatus is arranged as described above, and it necessitates a staff of test for the diagnostic operation of the apparatus. The diagnostic scheme is limited in that the test staff selects each turn loop manually and observes the response on the monitor panel 23, and the apparatus lacks in the ability of automatic self-diagnosis.

SUMMARY OF THE INVENTION

A prime object of the present invention is to provide an image transmission apparatus capable of implementing various kinds of self-diagnosis automatically and successively.

Another object of the present invention is to provide an image transmission apparatus which is relatively inexpensive, relatively simple in structure, more superior in accuracy and performance than conventional counterparts, and capable of accomplishing the reliable diagnosis.

A further object of the present invention is to provide an image transmission apparatus capable of diagnosing the transmission of moving images.

A still further object of the present invention is to provide an image transmission apparatus which realizes automatic recovery for a detected flat if it occurs.

A still further object of the present invention is to provide an image transmission apparatus which immediately notifies a test result to a remote station.

A still further object of the present invention is to provide an image transmission apparatus which executes the test conforming to an external instruction issued through the transmission line.

According to a first aspect of the present invention, with the intention of achieving the foregoing objectives, a reference video signal is supplied to a loop path and a resulting signal which has looped the path is compared with the original reference video signal so as to detect an abnormality. The image transmission apparatus based on the first aspect enables the automatic self-diagnosis, which readily reveals the result of diagnosis.

According to a second aspect of the present invention, a reference video signal is supplied to a loop path and a resulting signal which has looped the path is compared with the original reference video signal, with a prescribed value of error being allowed, so as to detect an abnormality. The image transmission apparatus based on the second aspect allows of a small difference between the original and loop video signals thereby to prevent erroneous detections.

According to a third aspect of the present invention, reference video signals of two or more frames are used for the diagnosis. The image transmission apparatus based on the third aspect enables the self-diagnosis for moving images.

In the present invention, the image transmission apparatus is also capable of comprising a change-over means for switching the working system to the backup system in the duplicated transmitting circuit and receiving circuit if a fault is detected by a diagnostic circuit.

According to such structure, if a fault is generated, the transmitting circuit and receiving circuit are switched to the backup system, ensuring automatic recovery from a fault.

The present invention also includes a structure that an image transmission apparatus outputs the result of diagnosis to the transmission line. According to such structure, the result of diagnosis can immediately be transmitted to an external monitor apparatus.

The present invention also includes an image transmission apparatus which has a function to receive an instruction for self-diagnosis from an external circuit. According to such apparatus, it is possible to instruct self-diagnosis from a remote station.

These and other objects and nobel features of the present invention will be more apparent from the following detailed description taken in conjunction with the accompanying drawings. The drawings are solely intended for the illustrative purpose, and the scope of the present invention is not confined by the drawings.

BRIEF DESCRIPTION OF THE DRAWINGS

FIG. 6 is a block diagram of another pattern generator;

DETAILED DESCRIPTION OF THE PREFERRED EMBODIMENTS

Preferred embodiments of the present invention will be described in detail with reference to the drawings.

Figure 3:
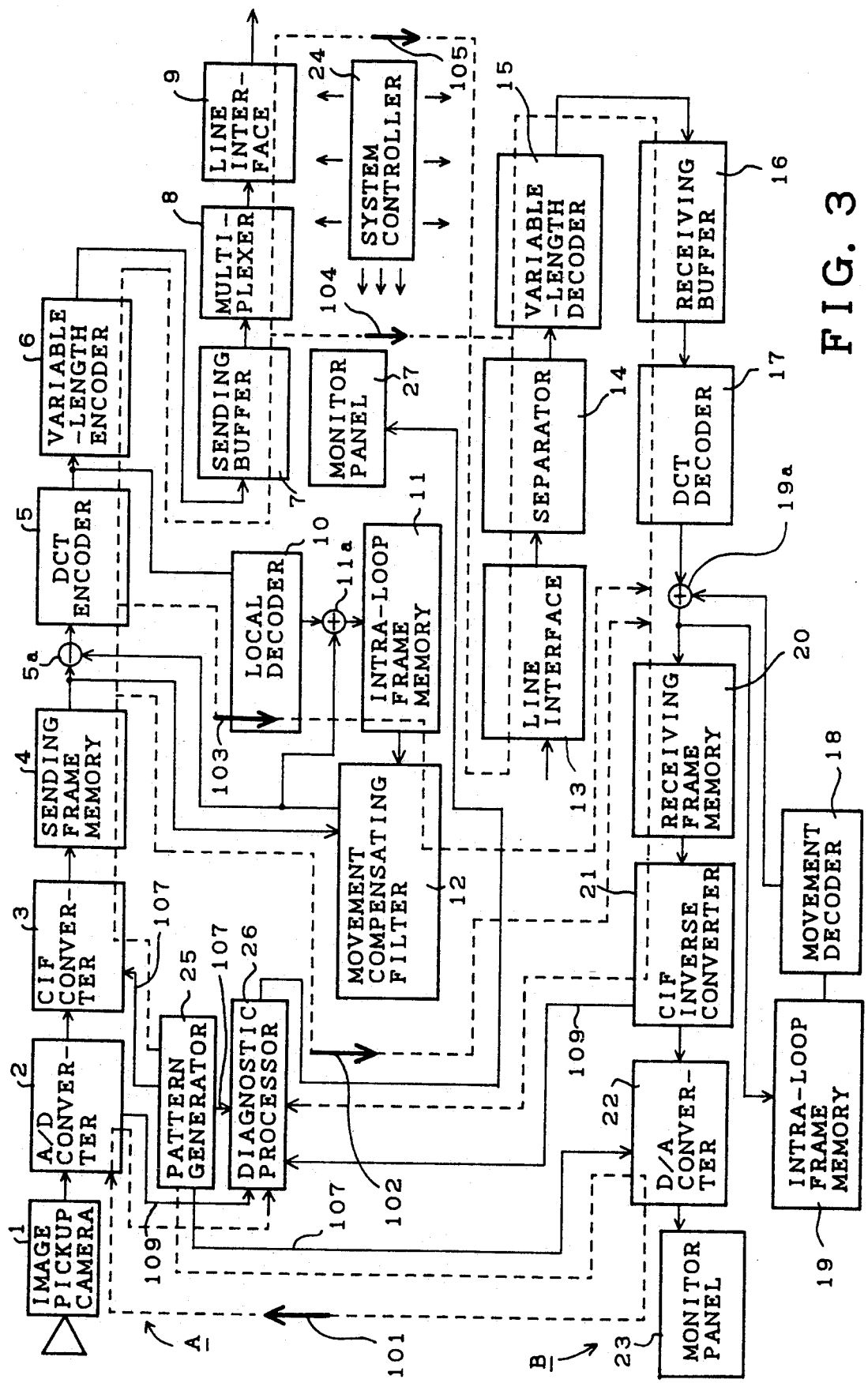
FIG. 3 is a block diagram of the image transmission apparatus according to the first embodiment of the present invention.

FIG. 3 shows the first embodiment of the present invention. In FIG. 3, functional blocks 1 through 24 are identical to those of the conventional apparatus, and explanation thereof will not be repeated.

Indicated by 25 is a pattern generator which generates a reference video signal 107, 26 is a diagnostic processor which judges the normality of each loop based on the comparison of the reference video signal which has been generated by the pattern generator 5 and fed through the loop path with the original reference video signal, and 27 is a monitor panel which displays the result of diagnosis provided by the diagnostic processor 26. Indicated by A is a transmission circuit system including the functional blocks 1 through 12, and B is a reception circuit system including the functional blocks 13 through 23.

Figure 4:
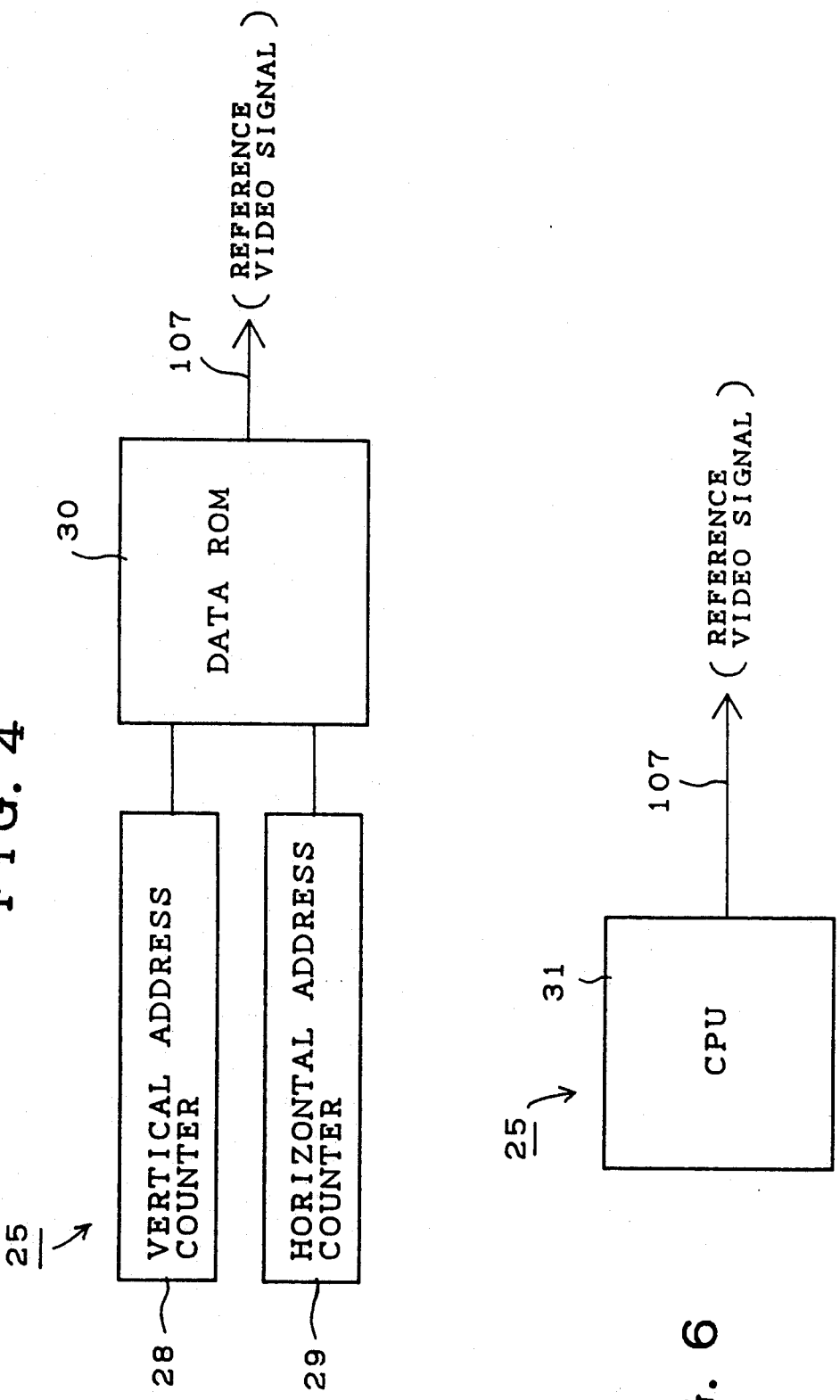
FIG. 4 is a block diagram of a pattern generator in the apparatus of FIG. 3.

FIG. 4 is a block diagram showing the internal arrangement of the pattern generator 25. In the figure, indicated by 28 a vertical address counter which generates vertical addresses for a data ROM 30, 29 is a horizontal address counter which generates horizontal addresses for the data ROM 30. The data ROM 30 delivers a variety of reference video signals as pattern signals by being addressed by the vertical address counter 28 and horizontal address counter 29. Indicated by 107 is a reference video signal read out of the data ROM 30 to be supplied to the CIF converter 3, D/A converter 22 and diagnostic processor 26.

Figure 5:
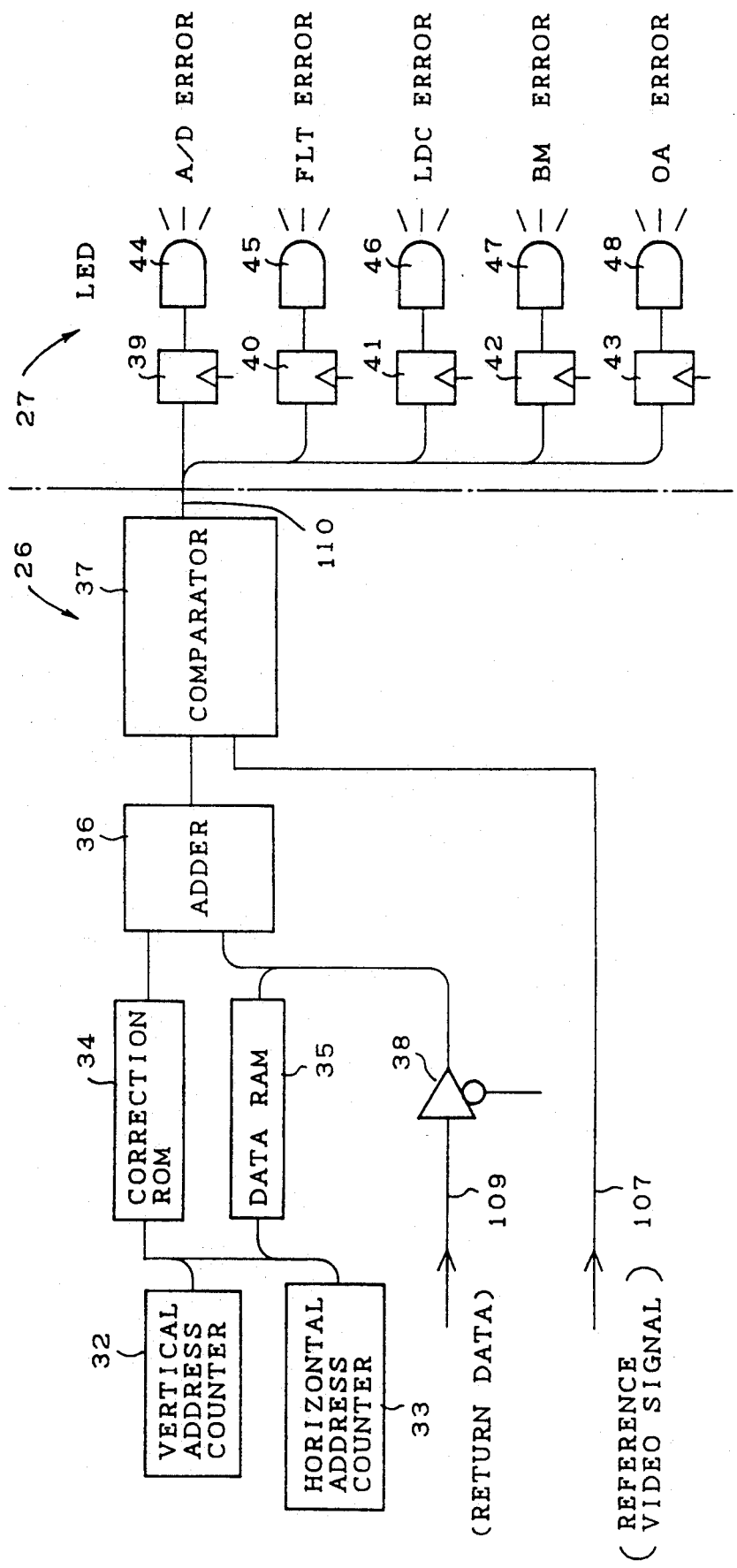
FIG. 5 is a block diagram of a pattern diagnostic processor and a diagnosis result monitor panel of the apparatus of FIG. 3.

FIG. 5 is a block diagram showing the internal arrangement of the diagnostic processor 26 and the monitor panel 27. In the figure, indicated by 32 is a vertical address counter which generates vertical addresses for a data RAM 35 and correction ROM 34, 33 is a horizontal address counter which generates horizontal addresses for the data RAM 35 and correction ROM 34. The correction ROM 34 serves as an allowable error generation means which stores values of error signal that would emerge when the reference video signal has been coded and decoded normally, and the data RAM 35 temporarily holds the reference video signal which has been fed through a loop path. Indicated by 36 is an adder which merges the contents of the correction ROM 34 and data RAM 35, 37 is a comparator which compares the video signal from the adder 36 with the reference video signal 107 provided by the pattern generator 25 in FIG. 3 and outputs diagnostic result data 110, 38 is a 3-state buffer which controls the passage of the loop data 109 from the A/D converter 2 or CIF inverse converter 21 in FIG. 3, 39-43 are latches which hold the diagnostic result data 110 from the comparator 37, and 44-48 are light-emitting diodes (LEDs) which indicate values of data held in the latches 39-43.

Next, the operations of the loop paths will be explained. The operation through the usual signal path in the normal state of the apparatus is identical to the conventional apparatus shown in FIG. 1, and explanation thereof will not be repeated.

The loop paths are used to test the operations of the sections of the image transmission apparatus. The loop pathes include an A/D turn loop 101, FIL turn loop 102, LDC turn loop 103, BM turn loop 104, and OA turn loop 105, as shown in FIG. 3.

When the system controller 24 commences the automatic self-diagnosis, the pattern generator 25 produces the reference video signal 107 for one frame. The reference video signal 107 is fed through the A/D turn loop 101 and shunted to the diagnostic processor 26, which compares the signal with the original reference video signal 107 thereby to judge whether the correct reference video signal 109 has returned, and the test result is displayed at the LEDs 44-48 on the monitor panel 27.

Subsequently, the diagnostic processor 26 tests the FIL turn loop 102, LDC turn loop 103, BM turn loop 104 and OA turn loop 105 sequentially in the same manner as the A/D turn loop 101, and the results are displayed on the monitor panel 27.

Figure 1:
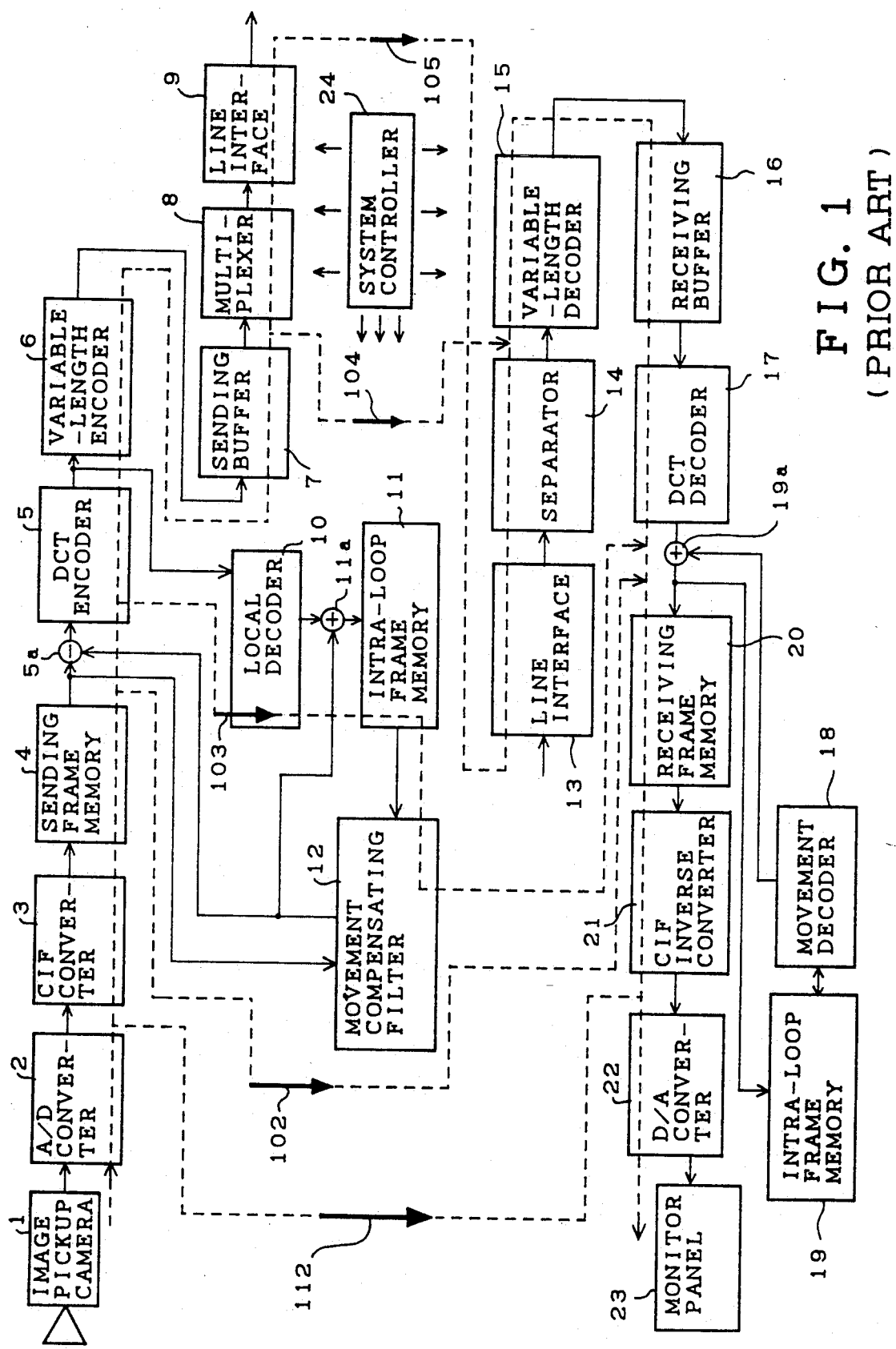
FIG. 1 is a block diagram of the conventional image transmission apparatus.

The A/D turn loop 101 of this embodiment has a path directivity opposite to the A/D turn loop 112 of the conventional apparatus shown in FIG. 1, in that the reference video signal 107 produced by the pattern generator 25 is a digital signal, and it is converted into an analog video signal by the D/A converter 22 and then immediately converted back to a digital reference video signal by being fed through the A/D converter 2 and finally it is shunted to the diagnostic processor 26.

Next, the pattern generator 25, diagnostic processor 26 and monitor panel 27 will be explained with reference to FIGS. 4 and 5. In FIG. 4, the pattern generator 25 delivers the reference video signal 107 in the form of a pattern image for one frame by reading it out of the data ROM 30 which is addressed by the vertical address counter 28 and horizontal address counter 29.

The diagnostic processor 26 and monitor panel 27 are arranged as shown in FIG. 5, for example. In FIG. 5, the return reference video signal (data) 109 is fed through the 3-state buffer 38 and stored temporarily in the data RAM 35 which is addressed by the vertical address counter 32 and horizontal address counter 33. The data is thereafter read out of the RAM 35 by being addressed by the vertical address counter 32 and horizontal address counter 33, and, at the same time, one of correction values, each of the values is corresponding to each loop test and stored in the correction ROM 34, is also read out. The each correction value stored in advance in the correction ROM 34 is an expected value of error of the reference video signal (return data 109)

which has normally looped through each loop path with respect to the original reference video signal, according to this embodiment.

Figure 2:
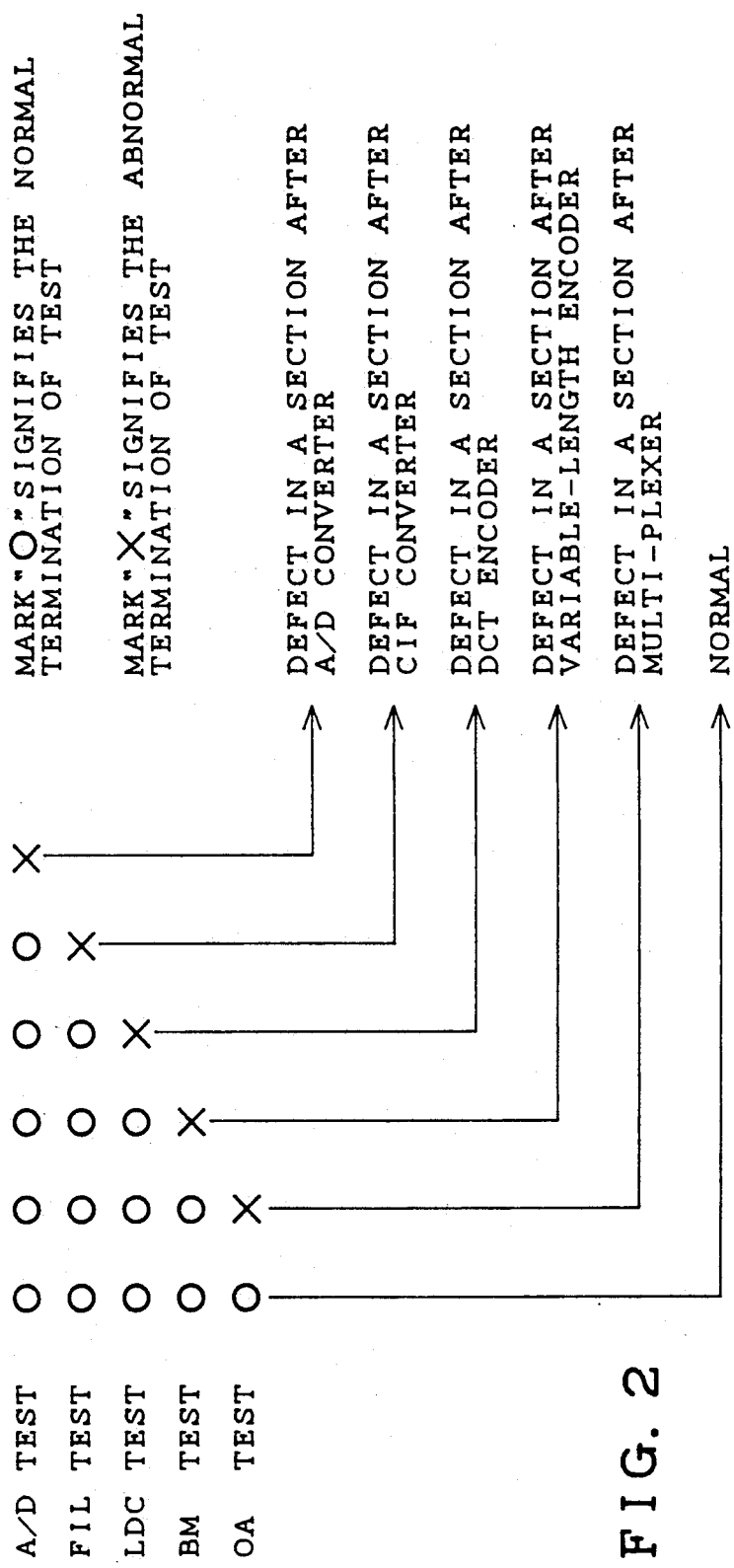
FIG. 2 is a diagram used to explain the judgement procedure of the cutoff loop tests.

The data read out of the correction ROM 34 and the data read out of the data RAM 35 are merged by the adder 36, and the result of adding is compared with the reference video signal 107 by the comparator 37, and the result of comparison, that is the diagnostic result data 110, is fed through one of the latches 39-43 and displayed on one of the LEDs 44-48. The comparator 37 compares the data from the adder 36 with the reference video signal (data) 107 on a pixel-by-pixel basis, and if the difference of both data is less than the prescribed error value, the loop path is judged to be normal. The judgement procedure of the loop tests for the image transmission apparatus based on this invention is identical to the conventional apparatus shown in FIG. 2. It is possible to compose the apparatus without the ROM 34. In such case, output signal of the buffer 38 inputs to the comparator 37 directly.

Above processings are executed for each loop test. Namely, during execution of the A/D return loop test, the return data 109 having passed the A/D return loop is inputted to the pattern diagnostic processor 26. The return data 109 is compensated by a compensation value corresponding to the A/D return loop test in the adder 36 and is then compared with the video signal, namely reference video signal 107 in the comparator 37. The result of comparison proves normal condition, the comparator 37 does not provide any output to the latches 39-43. If a fault condition is detected, the comparator 37 gives a signal which activate an output of latch 39 thereto. Namely, a diagnosis result data 110 activates an output the latch corresponding to the test executed when the diagnosis result is defective.

Thereafter, the FIL return loop test, LDC return loop test, BM return loop test and OA return loop test are sequentially conducted and the pattern diagnostic processor 26 executes the processing which is the same as that conducted for the A/D return loop test. However, a compensated value outputted from the compensation value ROM 34 corresponds to the test being conducted. Moreover, the comparator 37 outputs a signal, as the diagnosis result data 110, which activates an output of latch corresponding to the test being executed if the diagnosis result is not normal.

Although in the foregoing embodiment the pattern generator 25 of FIG. 3 employs the data ROM 30 shown in FIG. 4 to deliver the reference video signal 107, it may base the operation on a CPU 31 to produce the reference video signal 107, as shown in FIG. 6. In this case, the CPU 31 may be included in the system controller 24.

Here, two kinds of methods are considered as a method of loop test. In the first method, a signal is not applied to the subtractor 5a in the transmitting side and a signal is not applied to the adder 19a in the receiving side. In this case, a signal generated as a result of predetermined encoding for the original frame is applied to each loop respectively in the LDC return loop test, BM return loop test and OA return loop test.

In the second method, a plurality of the same frame are sequentially transmitted by the pattern generator 25. In this case, the processing which is the same as that by the first method is conducted for the first frame and difference from the preceding frame is generated by the subtractor 5a in the transmitting side for each frame after the second frame (contents are same as that of the first frame). Therefore, the signal obtained by encoding the difference is applied to each loop in the BM return loop test and OA return loop test. However, difference is always nearly equal to zero.

In each of the BM return loop test and OA return loop test, an output signal of the DCT decoder 17 is added to output signal of the movement decoder 18, namely to a video signal of preceding frame. The added value is supplied to a receiving frame memory 20.

In this case, as explained above, a plurality of the same frame are sequentially transmitted in each test. Accordingly, in each test, the return data 109 corresponding to a plurality of the same frame are inputted sequentially to a 3-state buffer 38 of the pattern diagnostic processor 26. Therefore, the comparator 37 compares each compensated return data with the reference video signal 107. Namely, comparison is executed as many times as the number which is equal to the number of sheets transmitted in each loop test. The comparator 37 outputs a diagnosis result data 110 which activates an output of the corresponding latch among the latches 39-43, when a return data not suitable for the reference video signal 107 is detected.

For instance, when the A/D return loop test is executed, if the return data not suitable for the reference video signal 107 is found, a signal which activates the latch 39 is given to the latch 39. As a result, LED 44 lights.

Therefore, if the data not applied to the reference video signal is found even once, as a result of the plural times of comparison in each loop test, the LED corresponding to the test being conducted among LEDs 44-48 lights.

Figure 7:
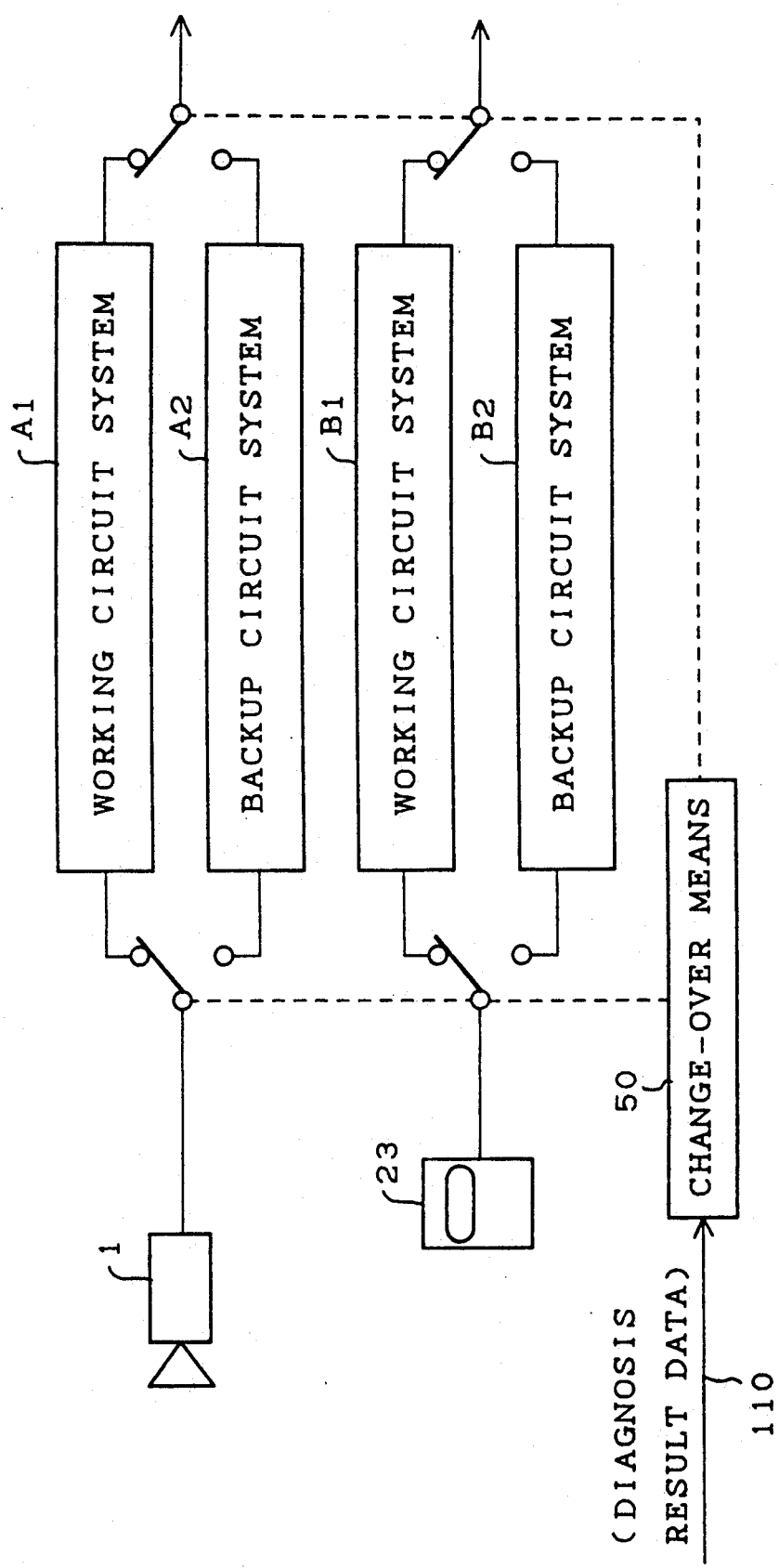
FIG. 7 is a block diagram of an image transmission apparatus according to the second embodiment of the present invention.

FIG. 7 is a block diagram indicting the second embodiment of the present invention. In this figure, $A_1$ is a working circuit system of the transmitting side which is formed by the A/D converter 2 to line I/F 9 like A of FIG. 3, while $A_2$ is a backup circuit system of the transmitting side formed similar to $A_1$. $B_1$ is a working circuit system in the receiving side which is formed by the line I/F 13 to D/A converter 22 just like B of FIG. 3. $B_2$ is a backup circuit system of the receiving side which is formed similar to $B_1$. In this case, the pattern generator 25 and pattern diagnostic processor 26 may be provided in the circuit systems $A_1$, $A_2$ in the transmitting side or in the circuit systems $B_1$, $B_2$ in the receiving side. Illustration of the structure will be omitted here.

Denoted by 50 is a change-over means which receives the diagnosis result data 110 from the pattern diagnostic processor 26 and switches, when a fault is detected in the result of return loop test, the working circuit system $A_1$ in the transmitting side and the working circuit system $B_1$ in the receiving side to the backup circuit system $A_2$ in the transmitting side and the backup circuit system $B_2$ in the receiving side.

Operations will then be explained hereunder. When the return loop test conducted in the same manner as that in the embodiment 1 has proved normal operation, the change-over means 50 connects the working circuit system $A_1$ of the sending side to the camera 1 and line, while the working circuit system $B_1$ in the receiving side to the line and monitor 23, responsive to the diagnosis result data 110 coming from the pattern diagnostic processor 26 not illustrated.

Meanwhile, when a fault is detected by the return loop test, the change-over means 50 switches the connection, namely connects the backup circuit system $A_2$ in the sending side to the camera 1 and line, while the backup circuit system B$_2$ in the receiving side to the line and monitor 23, responsive to the diagnosis result data 110 coming from the pattern diagnostic processor 26 in order to recover the system so that the system as a whole can continue the normal operation even if a fault is generated.

Moreover, in above embodiment 2, the duplicated circuit systems A$_1$, A$_2$ in the sending side and the circuit systems B$_1$, B$_2$ in the receiving side are switched by the change-over means 50, but it is also allowed that the circuit system A in the sending side and the circuit system B in the receiving side are respectively divided into the circuit groups of desired size and these are then duplicated allowing the selection through switching operation by the change-over means 50.

An image transmission apparatus of FIG. 7 has a full duplicated structure comprising the working and backup circuit groups within the same cabinet. Here, it is also possible to introduce the structure that the backup circuit group mounted in the other cabinet supports a plurality of working image transmission apparatus through change-over from the circuit group of the image transmission apparatus which has generated a fault.

Although, in each of the foregoing embodiments, the reference video signal provided by the pattern generator 25 is of one frame and the reference data stored in the correction ROM 34 in the diagnostic processor 26 is also of one frame, allowing the loop tests for only quiescent images, the apparatus may be designed to deal with reference video signal of two or more frames and the corresponding number of correction data so that the loop tests can be conducted for moving images.

The following describes the third embodiment of this invention which is applicable to the loop tests of moving images.

In this case, the pattern generator 25 shown in the block diagram of FIG. 4 has its data ROM 30 designed to store reference video signals (data) of two or more kinds of frames, with one of the frames being read out selectively as a reference video signal 107 by being addressed by the vertical address counter under control of the system controller 24. The system controller 24 issues a frame switching signal to all sections of the image transmission apparatus at the transition of frame.

Figure 8:
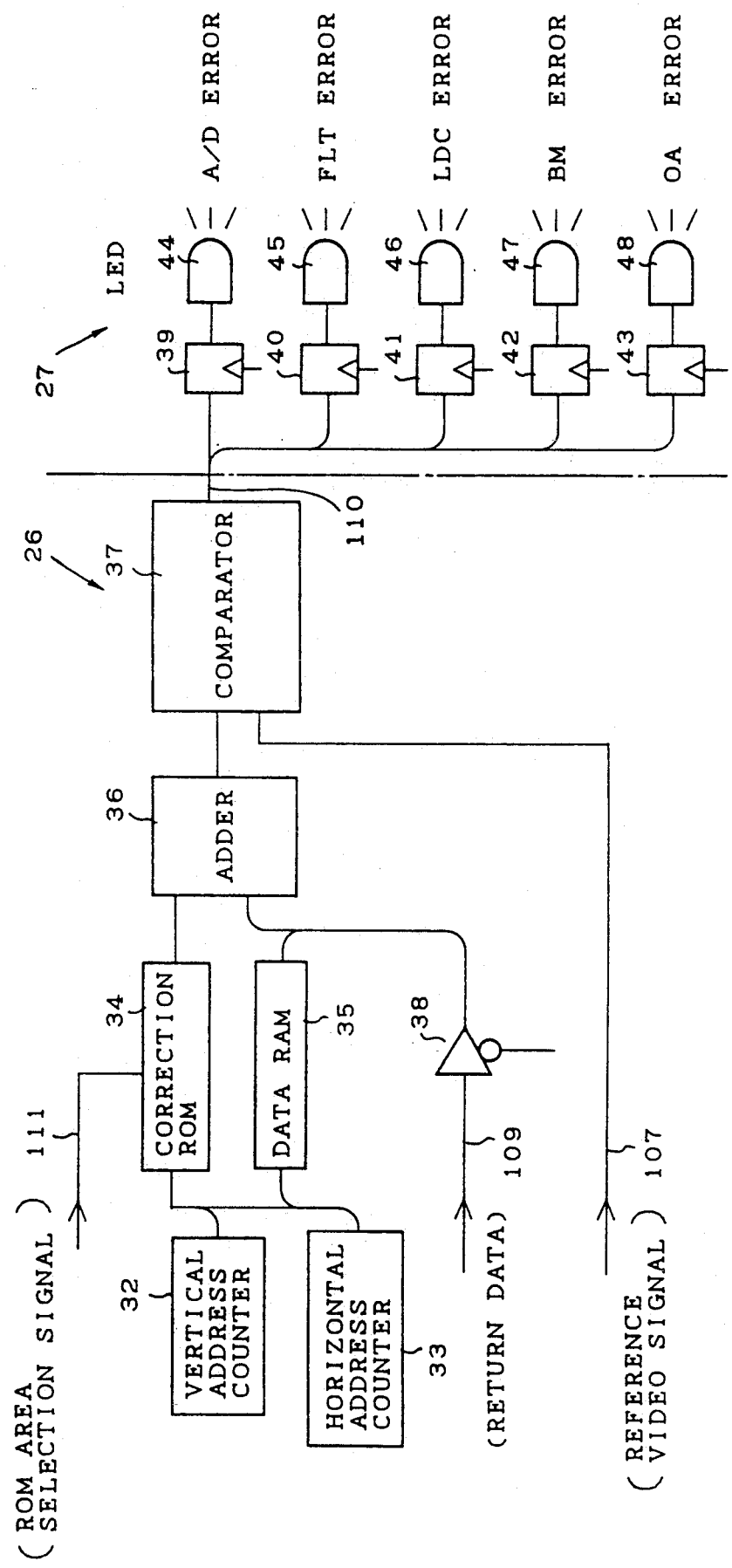
FIG. 8 is a block diagram of a pattern diagnostic processor and a diagnosis result monitor panel of the image transmission apparatus according to the third embodiment of the present invention.

In FIG. 8, indicated by 111 is a ROM area selection signal issued by the system controller 24, and the remaining portions are identical to those of FIG. 5. The signal 111 operates on the correction ROM 34 to read out correction data in correspondence to the reference video signal 107 of each of two or more frames provided by the pattern generator 25. The remaining operations are similar to the previous embodiment.

The return loop test for moving image will be explained in more detail. A pattern generator 25 first outputs a first frame. The data of this first frame is set to an intra-loop frame memory 11 through D/A converter 22, A/D converter 2, CIF converter 3, sending frame memory 4, DCT encoder 5 and local decoder 10. Moreover, it is also set to an intra-loop frame memory 19 in the receiving side.

Next, a system controller 24 outputs a frame switching signal. The pattern generator 25 outputs a second frame. The A/D return loop test and FIL return loop test are conducted for the second frame. As explained above, the return data 109 and correction value corresponding to test are added in the adder 36 during respective tests. The added value is compared with the reference video signal 107 of the second frame in the comparator 37. Since contents of the second frame are different from that of the first frame, each correction value outputted from the correction ROM 34 is different from each correction value corresponding to the first frame. Each correction value to be outputted is switched depending on instruction from the system controller 24.

Thereafter, the LDC return loop test, BM return loop test and OA return loop test are sequentially conducted. In each test, difference generated by the subtractor 5a is processed. Namely, an output signal of the DCT decoder 17 is a difference in the BM return loop test and OA return loop test and it is added to an output signal of the movement decoder 18, namely the video signal of preceding frame in the adder 19a. Here, the difference is a significant (not zero) value, unlike the difference in the return loop test for stationary image.

The return data corrected by the LDC return loop test, BM return loop test and OA return loop test is compared with the reference video signal 107 of the second frame in the comparator 37.

Here, the pattern generator 25 is capable of sequentially outputting different frames of three or more frames in each test. In this case, the comparator 37 compares each corrected return data corresponding to the two or more frames with the reference video signal of each frame. The corrected value outputted from the correction ROM 34 corresponds to the frame processed in current. In each comparison processing to be conducted sequentially, the comparator 37 outputs the signal which activates the output of the latch corresponding to the test being conducted among the latches 39-43, if the return data not suitable for the reference video signal 107. Therefore, when the return data not suitable for the reference video signal is found even once as a result of comparison operations of plural times in each loop test, the LED corresponding to the test being conducted among LEDs 44-48 lights.

In each embodiment explained above, the reference video signal 107 is compared one by one with the correction value of the return data 109 having passed the return loop path. However, it is also possible that the comparison is made using predetermined arithmetic operation of evaluation function such as a means value for each data block or pixel block of predetermined size.

Moreover, in the embodiments explained above, the diagnosis result data 110 outputted from the pattern diagnostic processor 26 is displayed on the diagnosis result display panel 27, but it is also possible that the diagnosis result is immediately notified to external monitor apparatus by outputting the diagnosis result data 110 to an external circuit through the line.

Figure 9:
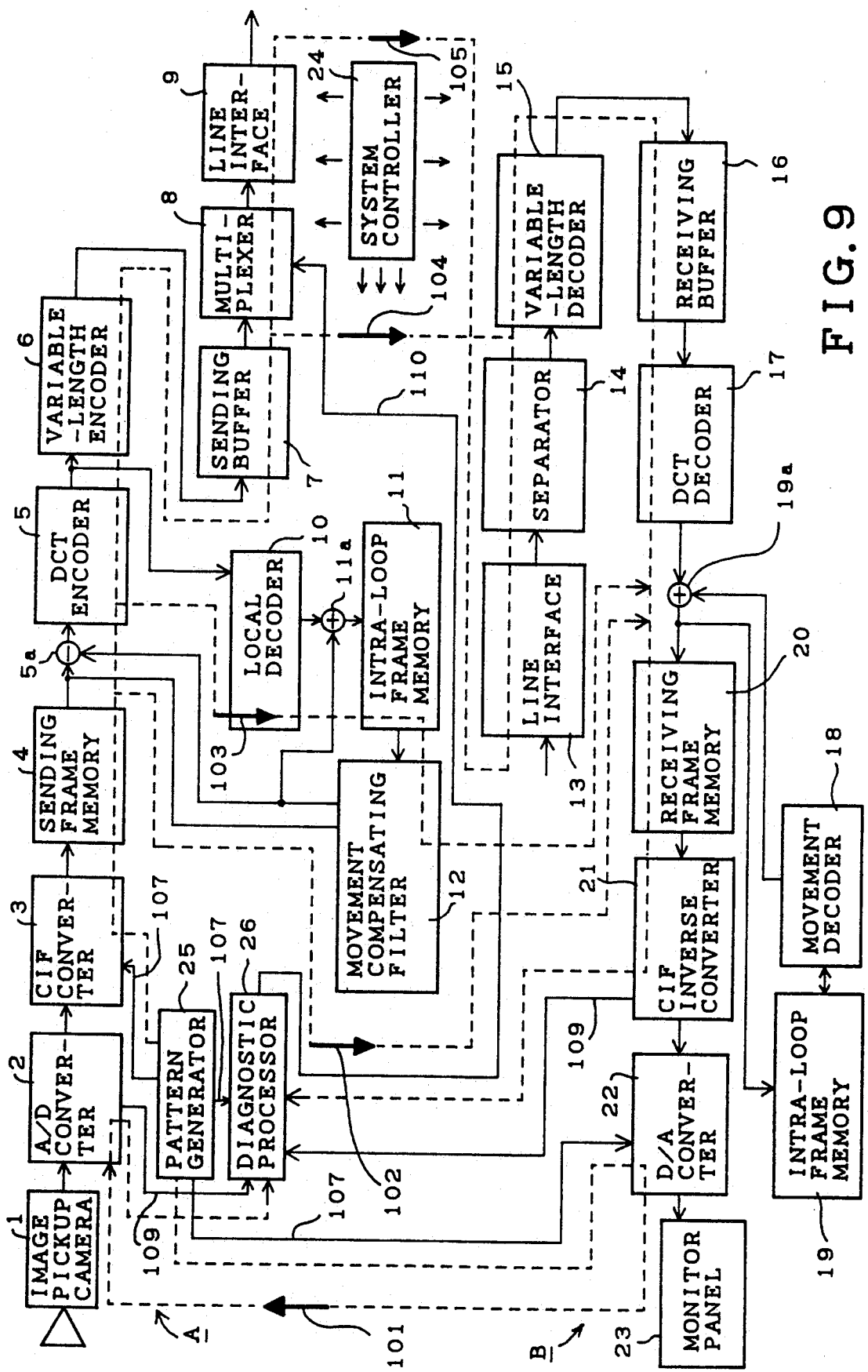
FIG. 9 is a block diagram of the image transmission apparatus according to the fourth embodiment of the present invention.

FIG. 9 is a block diagram indicating the embodiment of FIG. 4 of the present invention and the corresponding elements are denoted by the numerals similar to those in FIG. 3. Like the pattern diagnostic processor in the embodiment 1, the pattern diagnostic processor 26 in this embodiment adds the return data 109 stored in the data RAM 35 and the correction value read by the correction ROM 34 in the adder 36, then compares such added value with the original reference video signal 107 in the comparator and then outputs the result as the diagnosis result data 110.

This diagnosis result data 110 is sent to a multiplexer 8 by the pattern diagnostic processor 26 and is then sent to the line from the line I/F 9 through multiplexing with the other data. Thereby, result of diagnosis can immediately be notified to an operator of the remote station and monitor apparatus and control apparatus provided therein.

In above embodiment, the diagnosis result data 110 is sent to the line after multiplexing with the other data in the multiplexer 9, but it is also possible that the data is not multiplexed with the other data and is sent independent of the other data.

In addition, the system controller 24 starts automatically the pattern generator 25 and pattern diagnostic processor 26 for automatic diagnosis, but it is also allowed that the self-diagnosis is instructed from external circuits.

Figure 10:
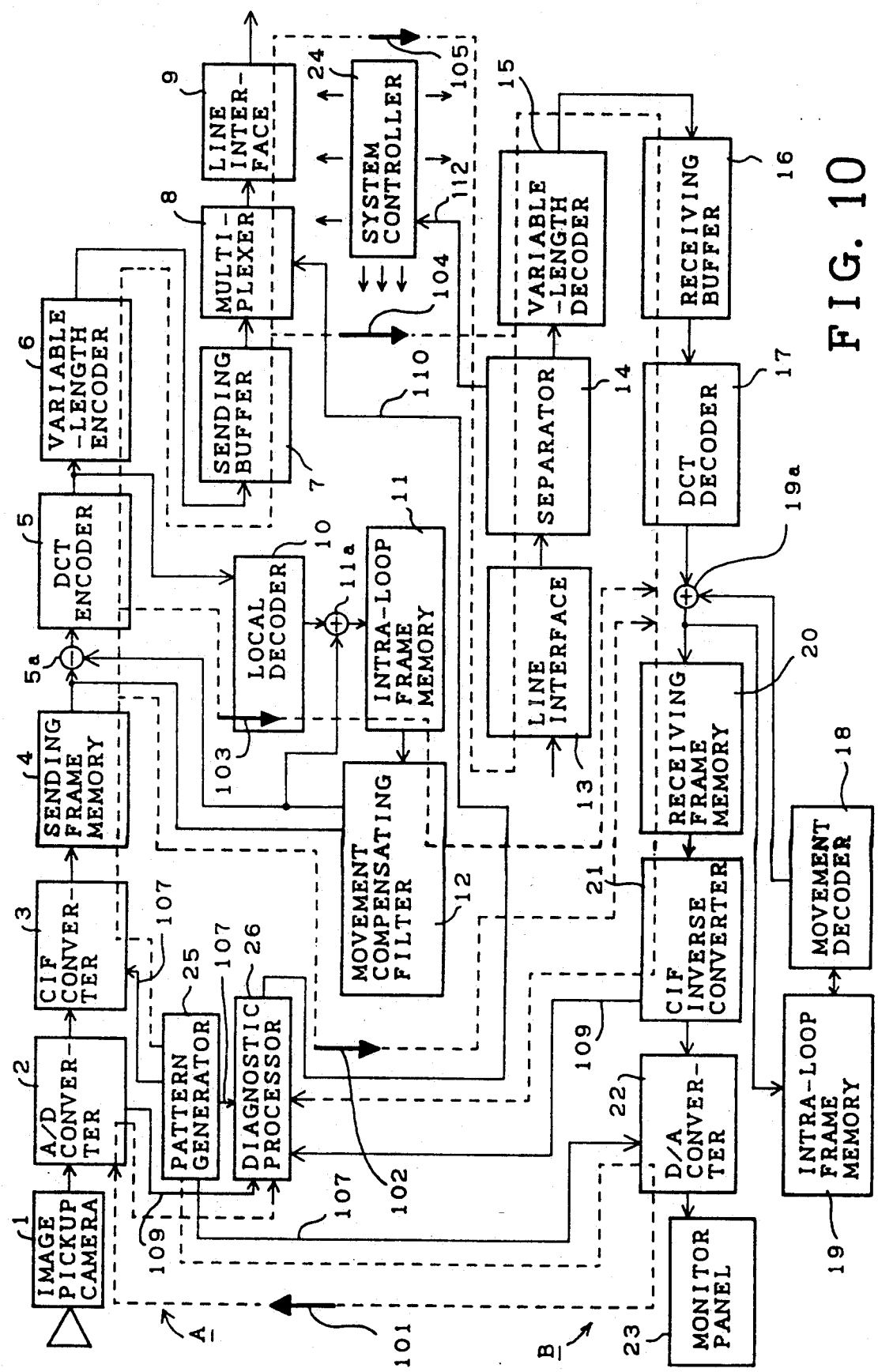
FIG. 10 is a block diagram of the image transmission apparatus according to the fifth embodiment of the present invention.

FIG. 10 is a block diagram indicating the fifth embodiment of the present invention. The elements like those in FIG. 3 are denoted by the like numerals. The self-diagnosis instruction data 112 coming over the line from external circuits is received by the line I/F 13 and is separated from the other data in the separator 14 and is then sent to the system controller 24. Upon reception of the self-diagnosis instruction data 112, the system controller 24 starts the pattern generator 25 and pattern diagnostic processor 26 and executes the return loop test by sequentially designating each return loop of the image transmission apparatus.

According to the first aspect of this invention, in which the image transmission apparatus is provided with the reference video signal generator and diagnostic processor, various kinds of self-diagnosis can be carried out automatically and successively, and the result of diagnosis can easily be understood even by unskilled persons.

According to the second aspect of this invention, in which diagnosis is based on the comparison of the return reference video signal with the original reference video signal, with an expected difference in a prescribed range being allowed, the image transmission apparatus can be tested reliably.

According to the third aspect of this invention, in which reference video signals of two or more frames are used for the loop tests, the image transmission apparatus can be tested for the transmission of moving images.

The image transmission apparatus which is capable of switching the duplicated working and backup circuit systems in the sending and receiving sides responsive to the diagnosis result data generated by the fault diagnostic circuit automatically recovers the system using the backup circuit systems in the sending and receiving sides, even if a fault is generated in the working circuit systems of the sending and receiving sides.

The image transmission apparatus which can output the diagnosis result data generated by the fault diagnosis circuit to the line can immediately notify the result to an operator in the remote station or to the monitor apparatus or other apparatus provided therein.

The image transmission apparatus having a function to receive the instruction to start the reference video signal generator and diagnostic processor coming over the line from external circuits is capable of starting self-diagnosis by the remote manipulation even if a testing person is not attendant.

What is claimed is:

1. An image transmission and reception apparatus comprising a circuit system of the sending side for encoding a video signal and sending over a line the encoded video signal; a circuit system of the receiving side for decoding the encoded video signal received from the line to recover said video signal; a return loop connected between a predetermined point of said circuit system of the sending side and a predetermined point of said circuit system of the receiving side in order to return said recovered video signal for the purpose of loop test; a reference video signal generator for inputting a reference video signal to said loop; and a fault diagnostic circuit for detecting a fault by comparing the reference video signal returned from the return loop and the original reference video signal.

2. An image transmission and reception apparatus according to claim 1, wherein said circuit system of the sending side comprises an A/D converter for A/D conversion of the video signal; a sending frame memory for storing digitalized video signal; a subtractor for obtaining a difference signal from the video signal of a preceding frame and an output signal of said sending frame memory; a DCT encoder for discrete cosine conversion of said difference signal; a variable length encoder for variable length encoding of an output of said DCT encoder; a sending buffer for storing variable length codes outputted from said variable length encoder and a first line interface for outputting variable length code of said sending buffer; said circuit system of the receiving side comprises a second line interface for receiving signal from the line; a variable length decoder for decoding the received signal; a receiving buffer for storing an output signal of said variable length decoder; a DCT decoder for discrete cosine conversion of the signal within said receiving buffer; and adder for adding an output signal of said DCT decoder and the video signal of said preceding frame; a receiving frame memory for storing an output of said adder and a D/A converter for D/A conversion of the digitalized video signal; and said loop comprises an A/D return loop for connecting the output side of said A/D converter and the input side of said D/A converter; a FIL return loop for connecting the output side of said sending frame memory and the input side of said receiving frame memory and the input side of said receiving frame memory; an LDC input side of said receiving frame memory; an LDC return loop for connecting the output side of said DCT encoder and the output side of said DCT decoder; a BM return loop for connecting the output side of said sending buffer and the input side of said variable length decoder; and an OA return loop for connecting the output side of said line interface of the sending side and the input side of said line interface in the receiving side.

3. An image transmission apparatus comprising a circuit system of the sending side for sending an encoded video signal over a line; a backup circuit system of the sending side for backing up said circuit system in the sending side; a circuit system in the receiving side for decoding the encoded video signal received from the line to recover said video signal; a backup circuit system of the receiving side for backing up the circuit system of the receiving side; a return loop connected at a predetermined point of the circuit system of the sending side and a predetermined point of the circuit system of the receiving side to return a signal for a loop test; a reference video signal generator for inputting the reference video signal to the loop; a fault diagnostic circuit for detecting a fault by comparing the return data of the reference video signal returned through the loop and the original reference video signal; and a change-over means for switching, when said fault diagnostic circuit has detected a fault, from the circuit system of the sending side and the circuit system of the receiving system to the backup circuit system of the sending side and backup circuit system of the receiving side.

4. An image transmission and reception apparatus to claim 3, wherein said circuit system of the sending side and the backup circuit system of the sending side respectively comprise an A/D converter for A/D conversion of the video signal; a sending frame memory for storing digitalized video signal; a subtractor for obtaining a difference signal from the video signal of a preceding frame and an output signal of the sending frame memory; a DCT encoder for discrete cosine conversion of said difference signal; a variable length encoder for variable length encoding of an output of said DCT encoder; a sending buffer for storing variable length codes outputted from said variable length encoder and a line interface for outputting the variable length code of said sending buffer to the line; said circuit system of the receiving side and the backup circuit system of the receiving side respectively comprise a line interface for receiving a signal from the line; a variable length decoder for decoding the received signal; a receiving buffer for storing an output of said variable length decoder; a DCT decoder for discrete cosine inverse conversion of the signal in said receiving buffer; an adder for adding an output signal of said DCT decoder and the video signal of said preceding frame; a receiving frame memory for storing an output of said adder and a D/A converter for D/A conversion of digitalized video signal; and said loop comprises an A/D return loop for connecting the output side of said A/D converter and the input side of said D/A converter; a FIL return loop for connecting the output side of said sending frame memory and the input side of said receiving frame memory; an LDC return loop for connecting the output side of said DCT encoder and the output side of said DCT decoder; a BM return loop for connecting the output side of said sending buffer and the input side of said variable length decoder; and an OA return loop for connecting the output side of said line interface of the sending side and the input side of said line interface in the receiving side.

5. An image transmission and reception apparatus according to claim 1 or 3, wherein the reference video signal generator comprises a ROM for storing the video signal of a preceding frame as the reference video signal and the fault diagnostic circuit comprises a comparator for comparing the return data of loop test with the reference video signal and a display panel for displaying comparison result.

6. An image transmission and reception apparatus according to claim 5, wherein the reference video signal generator sequentially outputs the frames from ROM in the loop test and the comparator the defective test result on the display panel in the loop test when it has found the return data not suitable for the reference video signal.

7. An image transmission and reception apparatus according to claim 5, wherein said fault diagnostic circuit comprises a correction ROM and an adder, said correction ROM has an error value between the video signal generated after the reference video signal has normally passed each loop and the original reference signal, outputs a correction value corresponding to the loop test being conducted and said adder supplies a value obtained by adding the return data and a correction value outputted from said correction ROM to the comparator.

8. An image transmission and reception apparatus according to claim 1 or claim 3, wherein the reference video signal generator comprises a ROM for storing the video signals of two or more kinds of frames as the reference video signals and the diagnostic circuit comprises a comparator for comparing the return data of each loop test with the reference video signal and a display panel for displaying comparison result 9. An image transmission and reception apparatus according to claim 8, wherein the reference video signal generator sequentially outputs different kinds of frames from ROM in each loop test and the comparator defective test result on the display panel when it has found the return data not suitable for the reference video signal in each loop test.

10. An image transmission and reception apparatus according to claim 8, wherein the fault diagnostic processor comprises a correction ROM and an adder, said correction ROM has sets of the error value between the video signal generated after the reference video signal has passed normally the loop and the original reference video signal as many as the kinds of reference video signals and outputs a correction value corresponding to the loop test being conducted and the reference video signal processed in current, and the adder supplies a value obtained by adding the return data to the correction value outputted from said correction ROM to the comparator.

11. An image transmission and reception apparatus according to claim 2 or 4, wherein the reference video signal generator outputs the reference video signal when the A/D return loop test, FIL return loop test, LDC return loop test, BM return loop test and OA return loop test are executed respectively.

12. An image transmission and reception apparatus according to claim 1 or 3, wherein the fault diagnostic circuit outputs diagnosis result data to an external circuit over the line. line.

13. An image transmission and reception apparatus according to claim 1 or 3, wherein said reference video signal generator and fault diagnostic circuit are started by the self-diagnosis instruction data transmitted from an external circuit over the line.

* * * * *

UNITED STATES PATENT AND TRADEMARK OFFICE
CERTIFICATE OF CORRECTION

PATENT NO. : 5,274,446
DATED : December 28, 1993
INVENTOR(S) : Yasushi Ashida

It is certified that error appears in the above-indentified patent and that said Letters Patent is hereby corrected as shown below:

On the Title Page, Item [57], line 3, "recovery" should be --recovery.--
Column 3, line 44, "the." should be --the--.
Column 5, line 39, "5" should be --25--.
Column 12, line 30, "and" should be --an--.
Column 14, line 51, delete "line.".

Signed and Sealed this

Twenty-first Day of June, 1994

Attest:

BRUCE LEHMAN

*Attesting Officer*  *Commissioner of Patents and Trademarks*